United States Patent
Mehas et al.

(10) Patent No.: US 11,527,920 B2
(45) Date of Patent: Dec. 13, 2022

(54) ENHANCED FOREIGN OBJECT DETECTION WITH COIL CURRENT SENSING IN WIRELESS POWER TRANSFER SYSTEMS

(71) Applicant: Integrated Device Technology, Inc., San Jose, CA (US)

(72) Inventors: Gustavo James Mehas, Mercer Island, CA (US); Amit D. Bavisi, Los Gatos, CA (US); Nicholaus Wayne Smith, La Mesa, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 16/403,419

(22) Filed: May 3, 2019

(65) Prior Publication Data
US 2020/0169123 A1    May 28, 2020

Related U.S. Application Data

(60) Provisional application No. 62/821,899, filed on Mar. 21, 2019, provisional application No. 62/772,592, filed on Nov. 28, 2018.

(51) Int. Cl.
| | |
|---|---|
| *H02J 50/60* | (2016.01) |
| *H02J 7/02* | (2016.01) |
| *H02J 50/12* | (2016.01) |
| *G01V 3/10* | (2006.01) |

(52) U.S. Cl.
CPC ............... *H02J 50/60* (2016.02); *G01V 3/10* (2013.01); *H02J 7/025* (2013.01); *H02J 50/12* (2016.02)

(58) Field of Classification Search
CPC ............ H02J 50/60; H02J 5/005; H02J 7/025
See application file for complete search history.

(56) References Cited

U.S. PATENT DOCUMENTS

| | | | |
|---|---|---|---|
| 10,862,335 B2 * | 12/2020 | Baarman | ................ G01R 21/00 |
| 2016/0218520 A1 | 7/2016 | Mehas et al. | |
| 2016/0309418 A1 | 10/2016 | Sedzin et al. | |
| 2017/0163100 A1 | 6/2017 | Vocke et al. | |
| 2017/0366048 A1 | 12/2017 | Watanabe et al. | |

OTHER PUBLICATIONS

European Search Report, dated Mar. 31, 2020, from European Patent Application No. 19211875.0, pp. 1-8.

* cited by examiner

*Primary Examiner* — Ryan Johnson
*Assistant Examiner* — Colleen J O Toole
(74) *Attorney, Agent, or Firm* — Haynes and Boone, LLP

(57) ABSTRACT

Embodiments described herein provide foreign object detection based on coil current sensing. The transmitter power loss is computed directly based on the coil current, in conjunction with, or in place of the conventional computation based on transmitter input current. The enhanced precision of the computer power loss can be used to more accurately detect a foreign object near the transmitter coil during a wireless power transfer.

19 Claims, 10 Drawing Sheets

ENHANCED FOREIGN OBJECT
DETECTION WITH COIL CURRENT
SENSING IN WIRELESS POWER TRANSFER
SYSTEMS

CROSS REFERENCES

This application claims the benefit, under 35 U.S.C. § 119(e), of commonly-owned U.S. provisional application Nos. 62/772,592, filed on Nov. 28, 2018, and 62/821,899, filed on Mar. 21, 2019, both of which are hereby expressly incorporated herein by reference in their entirety.

TECHNICAL FIELD

Embodiments of the present invention are related wireless power transfer and more particularly to enhanced foreign object detection with coil current sensing in wireless power transfer systems.

DISCUSSION OF RELATED ART

According to some embodiments, Wireless power transfer (WPT), wireless power transmission, wireless energy transmission (WET), or electromagnetic power transfer is the transmission of electrical energy without wires as a physical link. In a wireless power transmission system, a transmitter device, driven by electric power from a power source, generates a time-varying electromagnetic or magnetic field, which transmits power across space to a receiver device, which extracts power from the field and supplies it to an electrical load. Wireless power transfer is useful to power electrical devices where interconnecting wires are inconvenient, hazardous, or are not possible. The transmitter circuit is usually built on an integrated circuit (IC) chip. Traditionally, due to limitations on the charging power, circuit area and foreign object detection capacity of the transmitter IC chip, a wireless power transmitter that includes one transmitter IC chip can only be used to charge one wireless power receiving device at a time. Thus, multiple wireless chargers are usually used if more than one wireless devices are to be charged at the same time. The cost of obtaining a number of wireless chargers can be significant.

In addition, foreign object detection (FOD) is continuously a problem for such systems. A foreign object can appear at any time during the transfer of wireless power between the transmitter and the receiver. The presence of a foreign object not only affects the efficiency of the wireless power transfer, but also the foreign object can be subject to excessive heating that can become dangerous.

Therefore, there is a need to develop a way of providing high power wireless power transfer for multiple wireless devices with an accurate and efficient FOD mechanism.

SUMMARY

In view of the FOD issues in high-power charging with multiple wireless devices, embodiments described herein provide a method for foreign object detection based on coil current sensing at a wireless power transmitting device. Specifically, the method includes determining, via a coil current sensing circuit at the wireless power transmitting device, a coil current value corresponding to a first coil current that passes through a first transmitter coil. The method further comprises computing, via a controller at the wireless power transmitting device, a transmitter power loss based on the coil current value. The method further comprises determining, during wireless power transfer from the wireless power transmitting device to a wireless power receiving device, an existence of a foreign object in vicinity of the first transmitter coil when a change in the computed transmitter power loss meets a threshold condition.

Embodiments described herein further provide a wireless power transmitting device for foreign object detection based on coil current sensing. The wireless power transmitting device includes a transmitter coil, a coil current sensing circuit coupled to the transmitter coil, and a controller. The controller is configured to determine, via the coil current sensing circuit, a coil current value corresponding to a first coil current that passes through a first transmitter coil, compute a transmitter power loss based on the coil current value, and determine, during wireless power transfer from the wireless power transmitting device to a wireless power receiving device, an existence of a foreign object in vicinity of the first transmitter coil when a change in the computed transmitter power loss meets a threshold condition.

These and other embodiments are discussed below with respect to the following figures.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
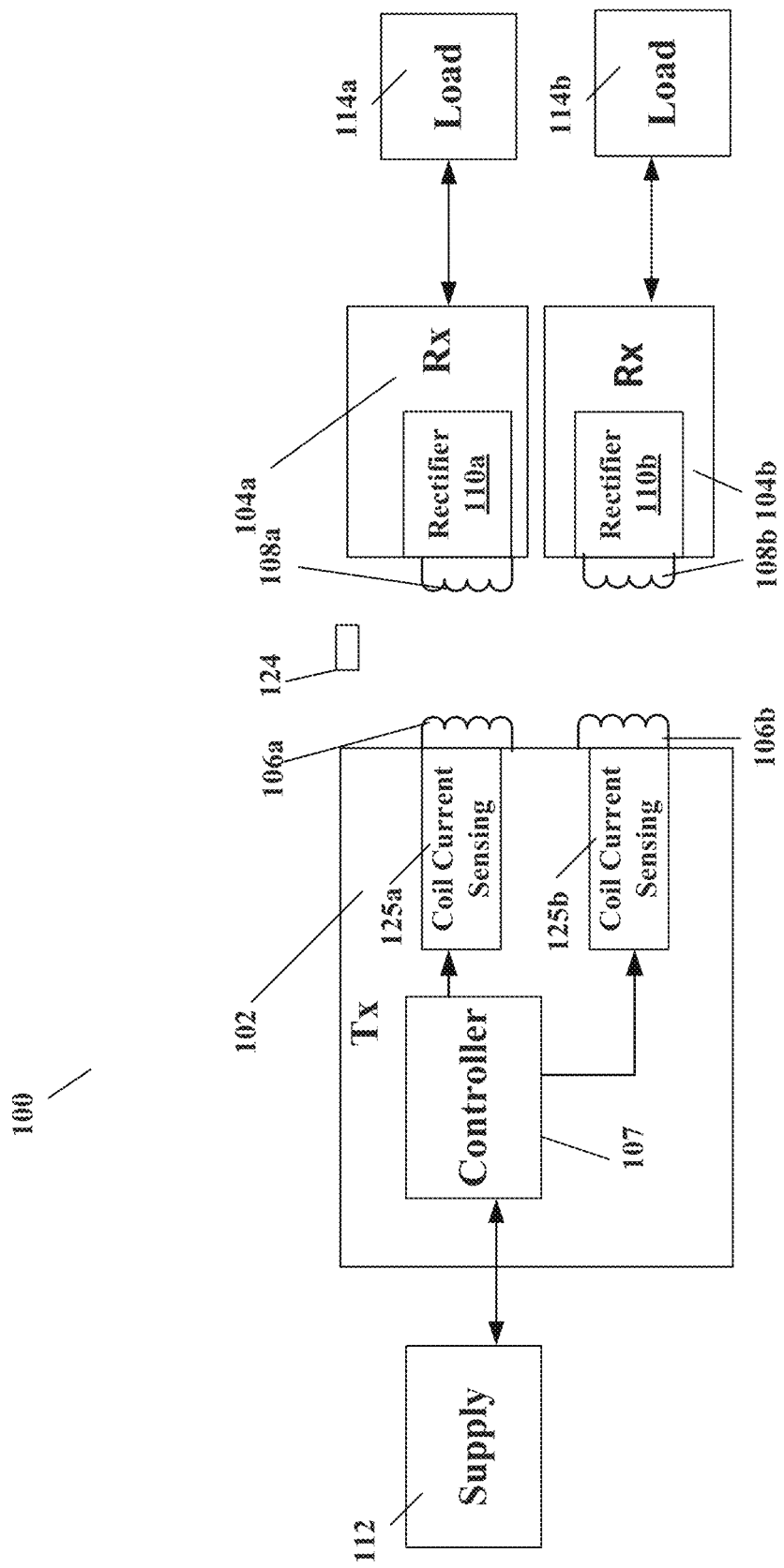
FIG. 1 illustrates an example wireless power transmission system that is configured to engage coil current sensing for a multi-coil transmitter, according to some embodiments.

FIG. 1 illustrates an example wireless power transmission system 100 that is configured to engage coil current sensing for a multi-coil transmitter, according to some embodiments. As illustrated in FIG. 1, a power transmitter TX 102 is coupled to a power supply 112 that provides power to drive TX 102. The controller 107 of Tx 102 is configured to generate an alternate current (AC) through the one or more transmitter coils 106a, 106b, each of which produces a time varying magnetic field. Each of the time varying magnetic fields produced by the transmitter coils 106a and 106b (herein collectively referred to as transmitter coil 106) induces a respective current in receiver coil 108a and 108b, respectively. Receiver coil 108a or 108b (herein collectively referred to as receiver coil 108) is coupled to a respective power receiver RX 104a or 104b (herein collectively referred to as receiver 104), respectively, each of which receives the transmitted wireless power. A rectifier circuit 110a or 110b (herein collectively referred to as rectifier 110) is within the receiving device 104a or 104b, respectively, configured to receive and rectifies wireless power received at the receiver coil 108a or 108b, and then in turn provides an output voltage for battery charging.

Thus, each of the receiver RX 104a and 104b is coupled to a load 114a or 114b, for example, a battery charger, which is configured to charge a battery with the received power. In this way, the load 114a and 114b can be charged with wireless power transferred from Tx 102 at the same time. Or alternatively, with the multiple transmitter coils 106a and 106b, the transmitting device 102 may have a larger active charging area and a receiving device can be placed with more freedom on the charging area to be charged.

In one embodiment, the Tx controller 107 can be built on a single IC chip. For the Tx 102 to charge more than one device at once, the controller 107 is configured to provide high power transfer of up to at least 20 W, authentication for safe high power wireless transfer. In addition, as more than one receiving device 104a and 104b are placed in vicinity to Tx 102, the controller 107 is configured to provide foreign object detection (FOD) via coil current sensing and increased X-Y placement ability for multiple receiving devices.

Figure 2A:
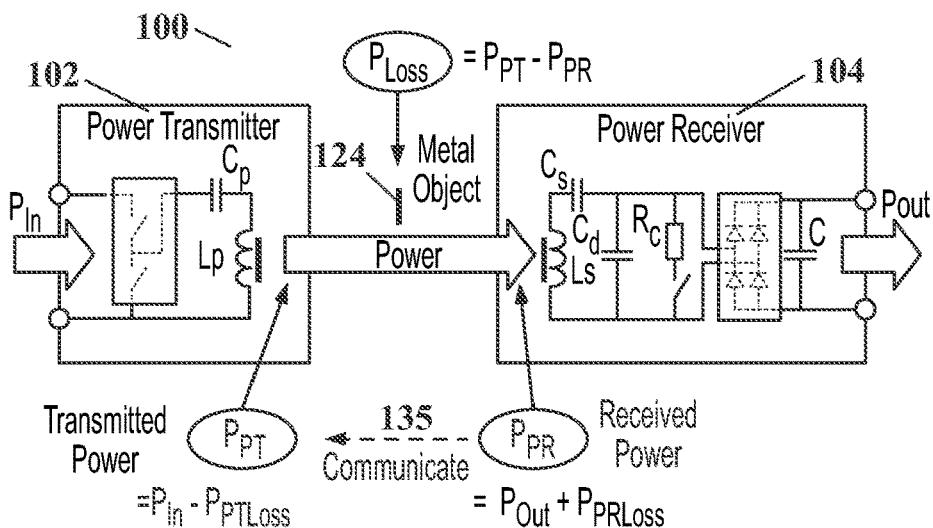
FIG. 2A provides an example diagrams illustrating the impact of a foreign object on the power loss of the wireless power transfer system shown in FIG. 1, according to an embodiment.

As is further illustrated in FIG. 1, when a foreign object 124 is placed in vicinity to the transmitter coil 106a-b or receiver coil 108a-b, the foreign object 124 can interfere with the transmission of power between transmitting device 102 and receiving device(s) 104a-b. For example, FIG. 2A provide an example diagram illustrating the impact of a foreign object on the power loss of the wireless power transfer system 100 shown in FIG. 1, according to an embodiment. In accordance with embodiments, the transmitting device 102 finds the power loss $P_{LOSS}$ when a metal object 124 is placed in vicinity to the transmitter coil during the wireless power transfer, calculated as the difference between the transmitted power $P_{PT}$ from transmitter coil and the received power $P_{PR}$ received at the receiver coil. If $P_{LOSS}$ is big, then a foreign object issue exists.

To calculate the power loss $P_{LOSS}$ during transfer, the transmitting device 102 calculates the input power $P_{IN}$ and the transmitter power loss $P_{PTLoss}$ and the receiving device 104 tells the transmitting device 102 the received power $P_{PR}$, e.g., by sending a received power packet (RPP) 135 to transmitting device 102. Specifically, existing systems under Wireless Power Consortium (WPC) standard usually computes the power $P_{PT}$ output from the transmitting device 102, by:

$$P_{PT} = Vin \text{ (or VBRG)} \times Iin - P_{PTLoss}$$

where Vin, Iin denote the input voltage (VBRG is the Bridge voltage applied to the the Tx DC to AC inverter to create the Tx magnetic field) and input current at transmitting device 102, respectively, and $TX_{LOSSES}$ denotes the power loss within the transmitting device 102, e.g., power consumed at the transmitter coil and electrical components necessary to create the Tx magnetic field. While at the receiving device 114, $P_{PR}$, the power received at the receiving device 104, is calculated by:

$$P_{PR} = Vrect \times Iout + P_{PRLoss}$$

wherein Vrect denotes the voltage at the rectifier circuit 110 at receiving devices 104, Tout denotes the output charging current from the receiving device 104, and $P_{PRLoss}$ denotes the power loss within the receiving device 104. $P_{PR}$ is then communicated to transmitting device 102 via RPP 135. Thus, to employ the conventional WPC calculation for FOD power loss, the average input current Iin and average input voltage Vin are measured, and then $Tx_{LOSSES}$ is calculated, e.g., via extrapolation.

However, extrapolation of transmitter power losses is not as good as direct measurement. Integrated Circuits (ICs) can be designed to directly measure the transmitter coil current. The measured transmitter coil current (RMS or peak current) and phase relative to Tx coil voltage provides an indicator of the transmitter coil losses, which is usually the major source of power loss in the transmitting device 102. Retrofitting this concept of transmitter coil current measurement into existing ICs can be challenging and costly.

Figure 2B:
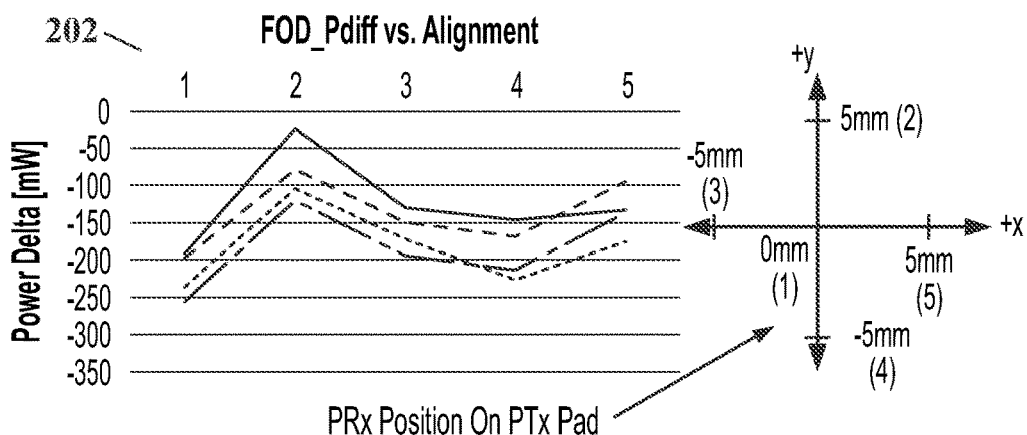
FIG. 2B provides example diagrams illustrating the impact of friendly metal heating on power loss calculations, according to an embodiment.
Figure 2C:
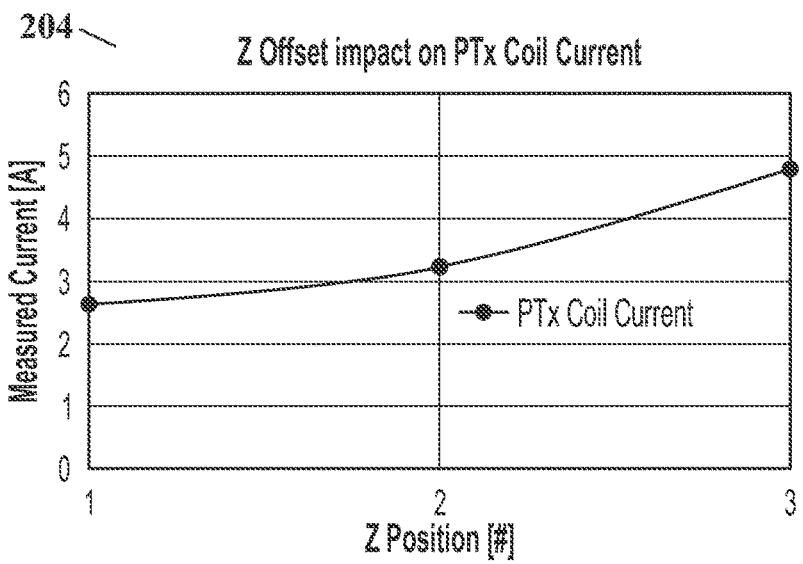
FIG. 2C provides an example diagram illustrating the impact of the distance in the Z direction on the transmitter coil current, according to an embodiment.

FIGS. 2B-2C provide example data diagrams illustrating impacts of the alignment between the transmitting device 102 and the receiving device 104 on the power loss and coil current, according to some embodiments described herein. The transmitter coil current can vary with the position of the receiver coil 108 (of the receiving device 104). For example, as shown in the data diagrams 202, the transmitter power loss may vary up to four times while the X-Y position of the receiving device varies, e.g., when the receiving device moves on the X-Y plane of the transmitter charging pad. As shown in data diagram 204, the transmitter coil current may change from 2.6 A to close to 5 A while the Z-position (e.g., the direction vertical to the charging panel) of the transmitter coil changes relative to the receiver coil.

Embodiments described herein provide a coil current sensing circuit to ICs with analog-to-digital converters (ADCs). The coil sensing circuit 125a-b may be placed internally to the transmitting device 102 to measure the coil current of the coils 106a-b. Or alternatively, the coil sensing circuit 125a-b may be placed external to the IC of transmitting device 102, and is communicatively coupled to the coils 106a-b. Specifically, the coil current sensing circuit is configured to measure a peak coil current value and the resonant frequency at the coil. The controller 107 then calculates a root mean square of the coil current for power loss calculation at transmitter coil 106a-b. In this way, the transmitter power loss computed directly based on the coil current (instead of the conventional computation based on transmitter input current) can provide improved precision of a change in the power loss. Thus, the computed power loss can be used to more accurately detect a foreign object near the transmitter coil during a wireless power transfer. The enhanced precision of power loss computation obviates or reduces the impact of X-Y position of the coils on FOD, and thus provides for enhanced X-Y freedom of charging placement.

Figure 3:
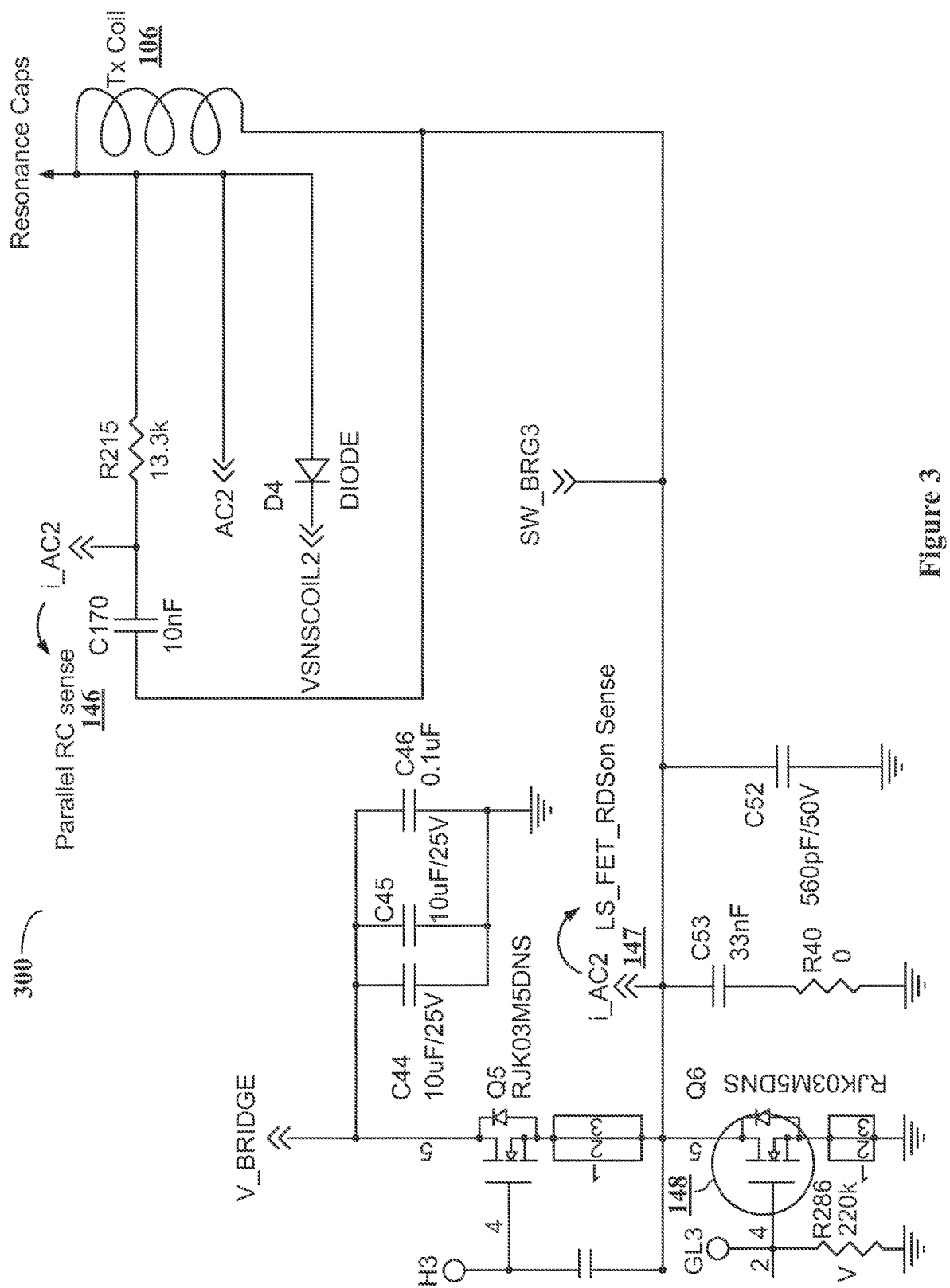
FIG. 3 provide an example schematic circuit diagram for a coil current sensing circuit, according to embodiments described herein.

FIG. 3 provide an example schematic circuit diagram 300 for a coil current sensing circuit (similar to 125a-b in FIG. 1), according to embodiments described herein. In one embodiment, the coil sensing circuit is coupled to transmitter coil 106, which is further coupled to resonance capacitors 144 (not shown). The coil sensing circuit obtains measurements such as an inductor alternate current resistance (ACR), the MOSFET drain-source on resistance (RDSON), i.e., the total resistance between the drain and source of the MOSFET, sensor resistance, and/or the like, and then measure the voltages across the inductor coil, the MOSFET, the sensor, and/or the like to monitor the coil current that passes through the Tx coil 106.

In one embodiment, inductor current sensing for the transmitter coil 106 may be conducted based on inductor current sensing: L/ACR=R×C such that the voltage across the equivalent lumped element alternate current resistor (ACR) of the transmitter coil 106 is equal to the voltage across the capacitor component of the parallel resistor-capacitor (RC) filter. L denotes the inductance of the coil 106, R denotes the resistance of resistor (e.g., see R215) in the parallel RC circuit, and C denotes the capacitance of the capacitor (e.g., see C170) in the parallel RC circuit. Thus, the voltage (at node 146) across the capacitor C170 in the parallel resistor-RC circuit consisting of capacitor C170 and resistor R215 is sampled. The measured voltage at node 146 of the RC circuit is indicative of the coil current that passes through Tx coil 106.

In one embodiment, the low side MOSFET RDSON can be measured, or a sensing resistor (which may add additional component cost and power loss) can be used to measure the coil current, e.g., by measuring the voltage (at node 147) across the low-side MOSFET Q6 (as shown at circle 148 in diagram 300) divided by the MOSFET RDSON, or the voltage across the sensing resistor divided by the sensing resistance. An OPAMP (shown at 127 in FIG. 4) may be used help these measurements as such measurements can be 4 times lower than the ACR sensing.

Figure 4:
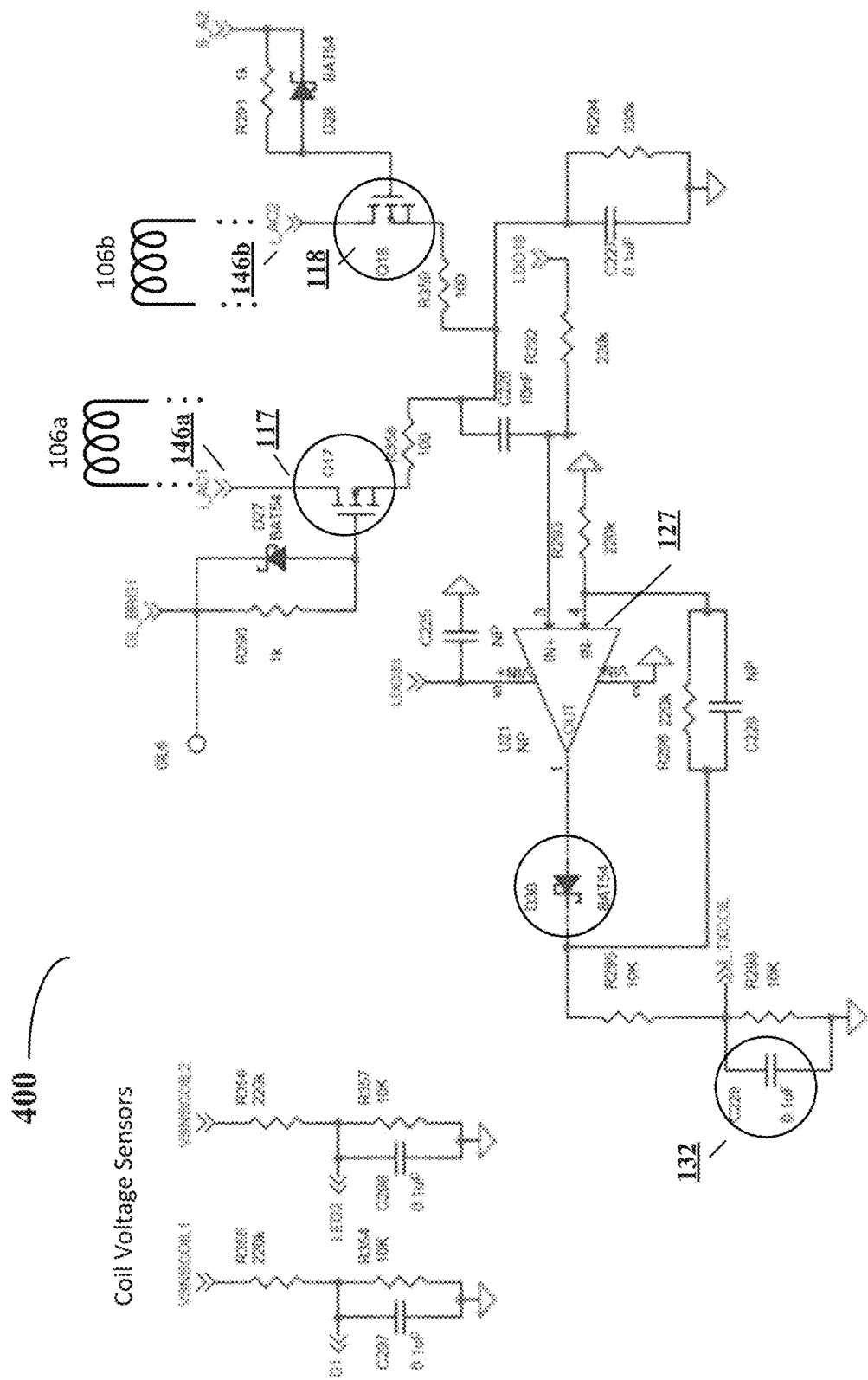
FIG. 4 provides an example schematic circuit diagram for an auto-selection circuit that selects a coil to monitor in a multi-coil transmitter, according to embodiments described herein.

FIG. 4 provides an example schematic circuit diagram 400 for an auto-selection circuit that selects a coil to monitor in a multi-coil transmitter, according to embodiments described herein. When the transmitter has more than one coils, e.g., transmitter coils 106a-b shown in FIG. 1, MOSFETs 117 and 118 are used to control which coil is to be measured. For example, the MOSFETs 117 and 118 are each coupled to transmitter coils 106a or 106b, respectively, and are each tied to a dedicated gate signal that turns the MOSFET 117 or 118 on or off to automatically select which coil is being monitored. Thus, MOSFET 117 or 118 only becomes an active path when the respective gate signal is positive, and the respective coil 106a or 106b is energized. When the MOSFET 117 or 118 is active, the voltage at node i_AC1 or i_AC2 is measured, respectively, to indicate the current of the respective coil coupled to MOSFET 117 or 118, e.g., by dividing the MOSFET RDSON of MOSFET 117 or 118.

In some embodiments, a parallel RC circuit (e.g., similar to c170 and R215 shown in FIG. 3) is placed in parallel to the transmitters coil 106a or 106b such that the MOFSET 117 or 118 may sample the voltage at node 146a or 146b via parallel RC sensing. The sampled voltage of the parallel RC circuit is indicative of the coil current that passes through Tx coil 106a or 106b, respectively.

For illustrative purpose, diagram 400 shows two coils 106a-b and two MOSFETs 117-118 for automatically selecting the coil to be measured. Multiple coils (e.g., more than two) can be used in the transmitter. Each transmitter coil (e.g., more than two) is coupled to a sampling MOSFET with a current sensing circuit for the respective coil such that the sampling MOSFET may be used to sample a voltage in the current sensing circuit, which is indicative of the coil current that passes through the respective transmitter coil.

Diagram 400 further includes an OPAMP 127 to amplify the signal from coil 106a or 106b before feeding to an analog-to-digital converter (ADC) that converts the analog current or voltage to a digital measurement to the processor (e.g., controller 107 in FIG. 1). In this way, the OPAMP 127 provides improved signal-to-noise ratio (SNR) and additional buffering of the signal.

Diagram 400 further shows a diode D30 at 131 coupled to the output of the OPAMP 127, which may serve as part of a peak detector to detect the peak voltage. In some examples, diode D30 charges the capacitor C229 (at 132) to the peak of the input voltage to diode D30 in a positive "half cycle" when the input voltage at diode D30 is higher than the voltage at C229. When the input voltage at diode D30 falls below the "peak" voltage stored on the capacitor C229, the diode D30 is reverse biased, blocking current flow from capacitor C229 back to the input end of diode D30. The capacitor C229 retains the peak voltage value even as the input voltage to diode D30 drops to zero. Thus, the peak coil current ICOIL_Peak can be measured by measuring the peak voltage retained by diode D30 and capacitor C229.

Figure 6:
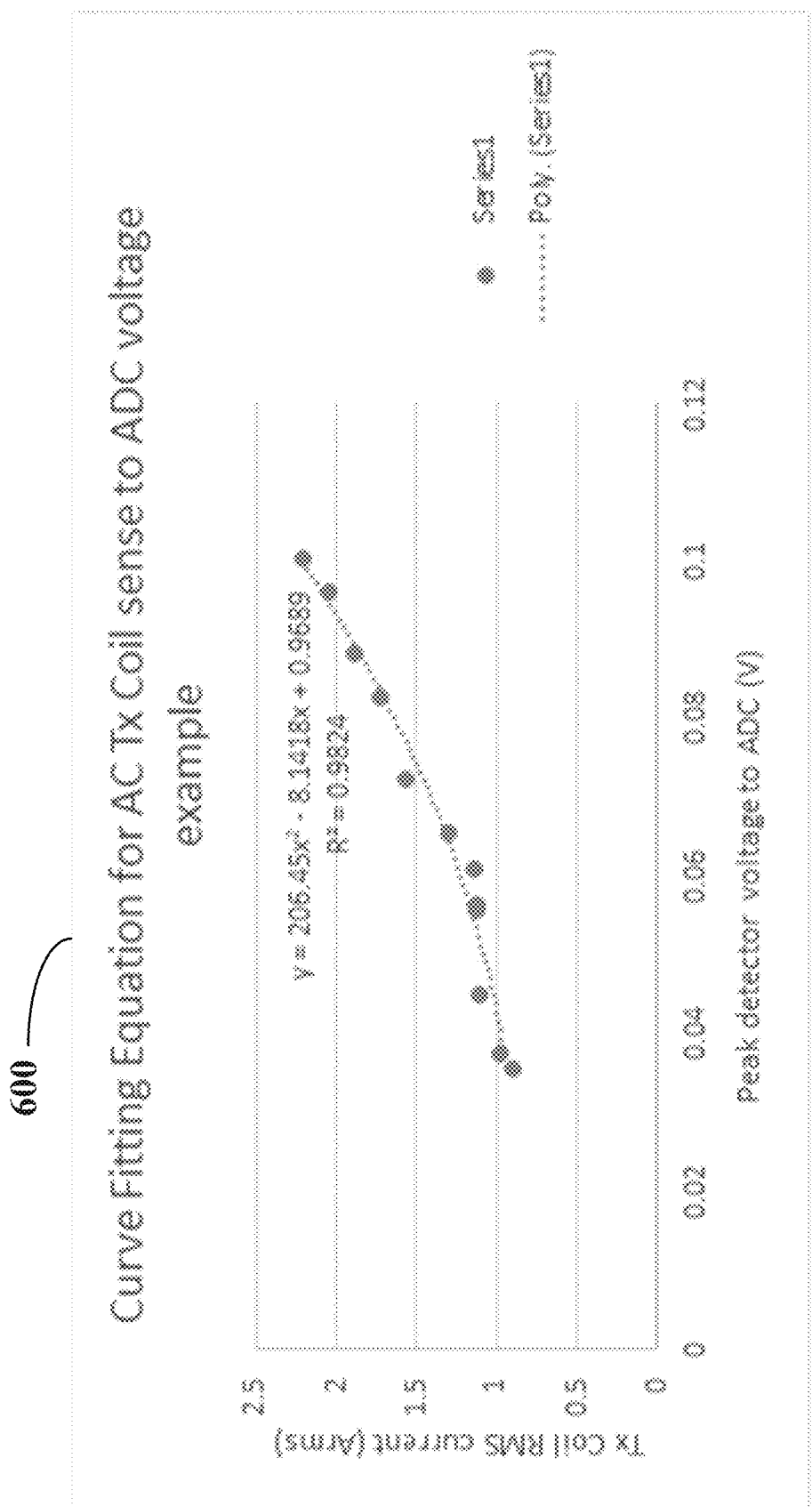
FIG. 6 provides an example data plot showing a curve fitting equation to calculate transmitter coil RMS current based on the peak detector voltage to ADC.

The resonant frequency F_Resonant is also measured (e.g., via Q measurement techniques) to convert the peak current ICOIL_PEAK to the root-mean square of the coil current ICOIL_RMS. ICOIL_RMS is then used to calculate the coil power loss. For example, the ICOIL_RMS may be computed via the following equation:

$$ICOIL\_RMS = a \times ICOIL\_ADC^2 - b \times ICOIL\_ADC + c$$

where ICOIL_ADC denotes the peak current fed to the analog-to-digital converter (ADC), and parameters a, b and c can be found by regressing data samples of peak detector voltage to ADC and the transmitter coil RMS current. For example, FIG. 6 provides an example data plot 600 showing a curve fitting equation to calculate transmitter coil RMS current based on the peak detector voltage to ADC. In this example, the ICOIL_RMS may be calculated as: $206.45x^2 - 8.1418x + 0.9689$, where x denotes the peak detector voltage to ADC.

Figure 5:
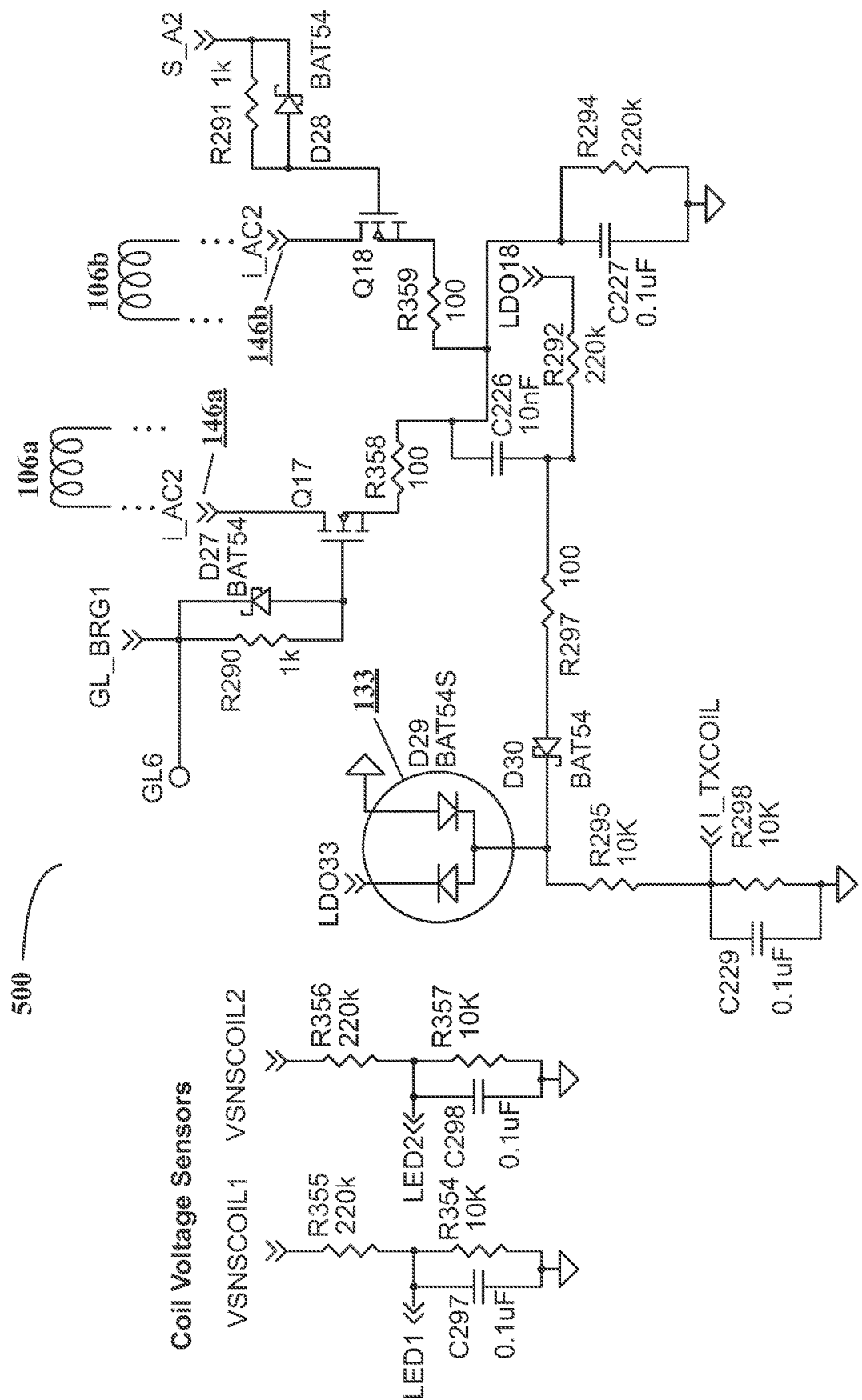
FIG. 5 provides an example schematic circuit diagram showing a multi-coil transmitter similar to that in FIG. 4 but with a diode method for ADC measurement, according to embodiments described herein.

FIG. 5 provides an example schematic circuit diagram 500 showing a multi-coil transmitter similar to that in FIG. 4 but with a diode method for ADC measurement, according to embodiments described herein. A diode limiter 133 consisting of two diodes connected in parallel in opposite directions is used to regulate the voltage or current signal before the signal is sent to the ADC.

Figure 7:
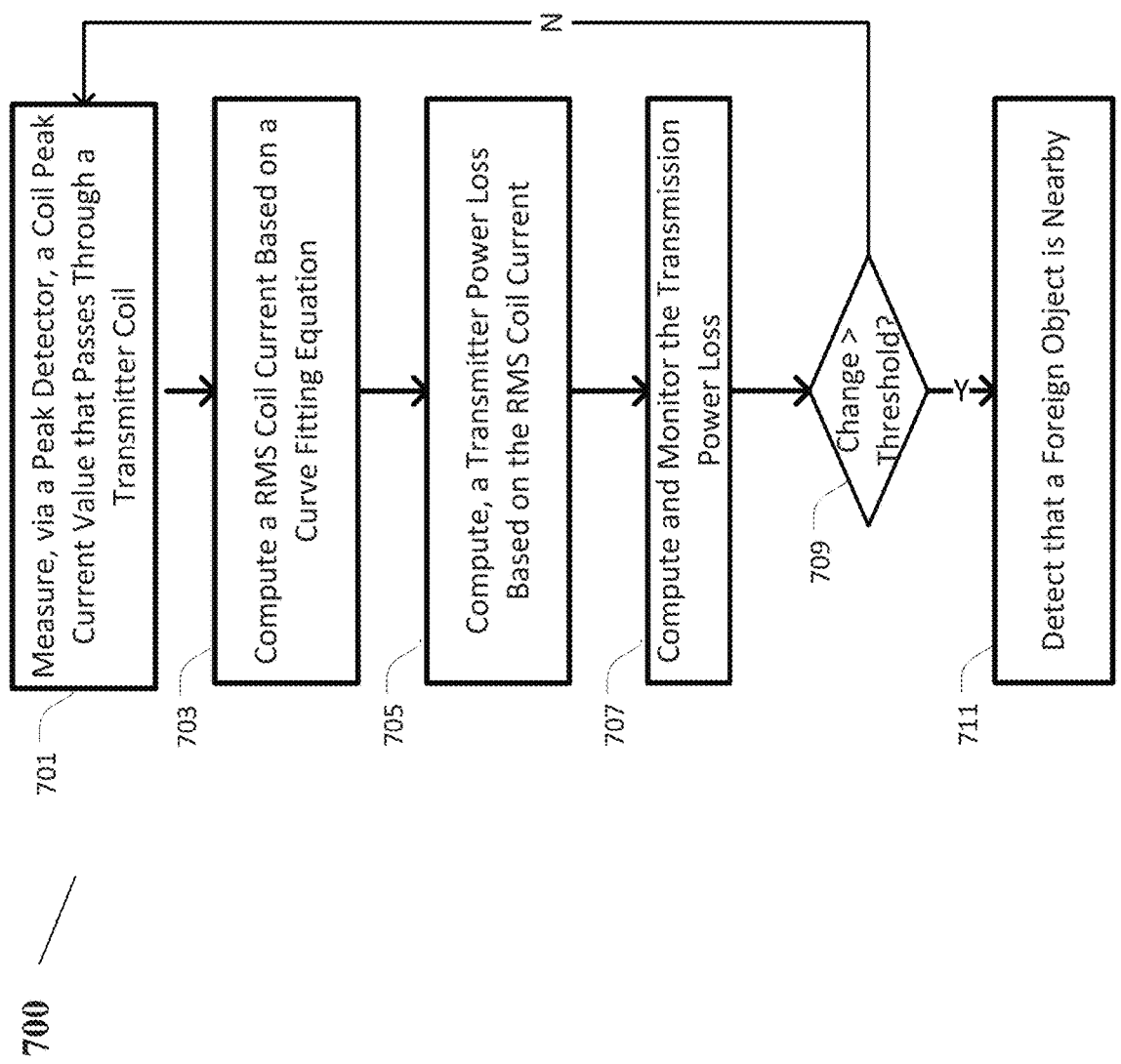
FIG. 7 provides an example logic flow diagram illustrating an example process for using coil current sensing to detect foreign objects, according to embodiments described herein.

FIG. 7 provides a simplified logic flow diagram illustrating an example process 700 for using coil current sensing to detect foreign objects, according to embodiments described herein. At step 701, the coil peak current value that passes through the transmitter coil is measured, via a peak detector (e.g., via peak detector diode 131). The coil current may be sensed by MOSFET sampling the voltage at a parallel RC circuit (e.g., see 146), by measuring MOSFET RDSON, and/or the like, as discussed in relation to FIGS. 3-5. The measured coil peak current is then fed to the ADC and the controller 107 of the transmitter. At step 703, the controller 107 computes a RMS coil current based on a curve fitting equation, e.g., as shown in FIG. 6. At step 705, the transmitter power loss is computed based on the RMS coil current, e.g., $P_{PTLoss}=ICOIL\_RMS^2 \times R_{coil}$. At step 707, the controller 107 is configured to compute and monitor the transmission power loss between the transmitting device and the receiving device. The relationship of the transmitter power loss and the power loss caused by a foreign object near the transmitter coil is described in relation to FIG. 2A, e.g., transmission loss $P_{LOSS}=Vin \times Iin - P_{PTLoss} - P_{PR}$, where $P_{PR}$ is obtained via RPP communication 135. At step 709, when the change in the transmission power loss is greater than a threshold, the controller 107 is configured to determine that a foreign object is nearby, at step 711. Otherwise, process 700 goes back to step 701, where the transmitter continues to measure the coil current and monitor power loss change through steps 701-707.

Figure 8A:
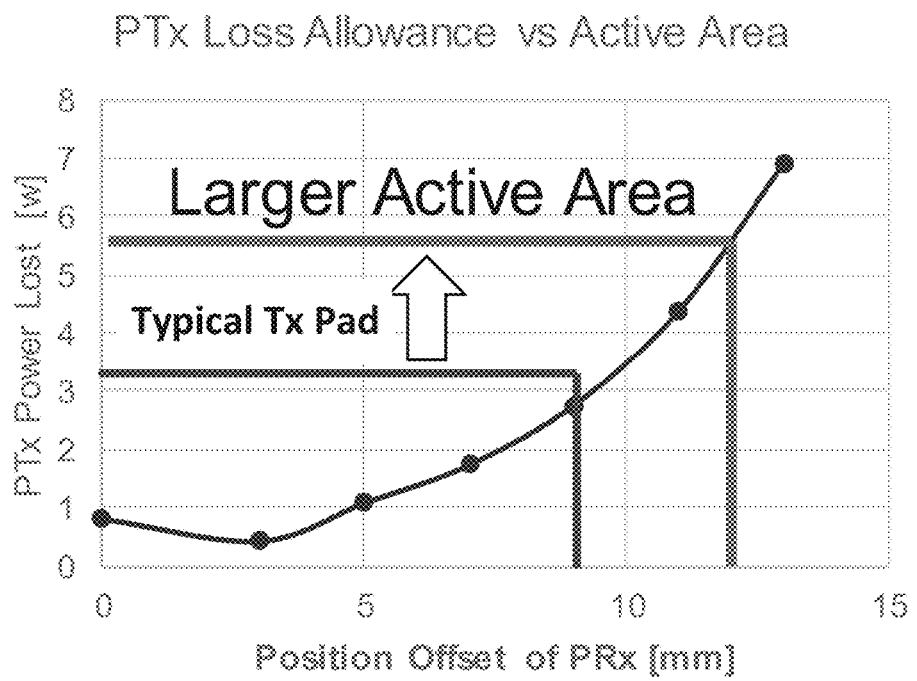
FIGS. 8A-8B provides example diagrams illustrating increased the X-Y active area of the charging plane of a wireless power transmitter, according to an embodiment described herein.
Figure 8B:
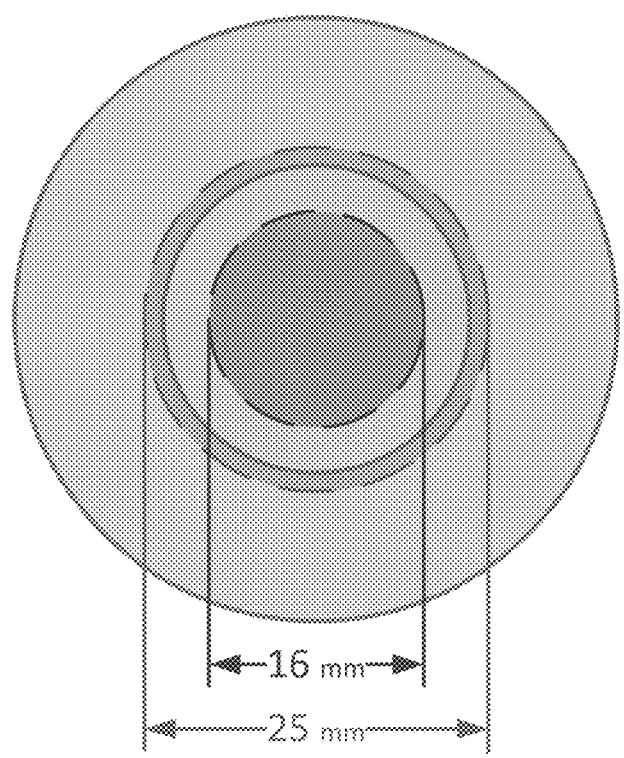

The coil current sensing circuits described in FIGS. 3-5 provide transmitter power loss calculated with improved precision, which in turn provides the precision of computed transmission power loss. With improved precision in transmission power loss, accuracy of FOD can be improved during the wireless power transfer, increasing the X-Y active area of the charging plane, as indicated in FIGS. 8A and 8B. The charging area, as indicated in FIG. 8A, may be increased by a factor of approximately 2 while the transmitter heating (the transmitter power loss) may increase by about 1.5 times. For example, as shown in FIG. 8B, the active area can increase from a diameter of 16 mm to 25 mm with enhanced X-Y freedom for FOD.

Figure 9A:
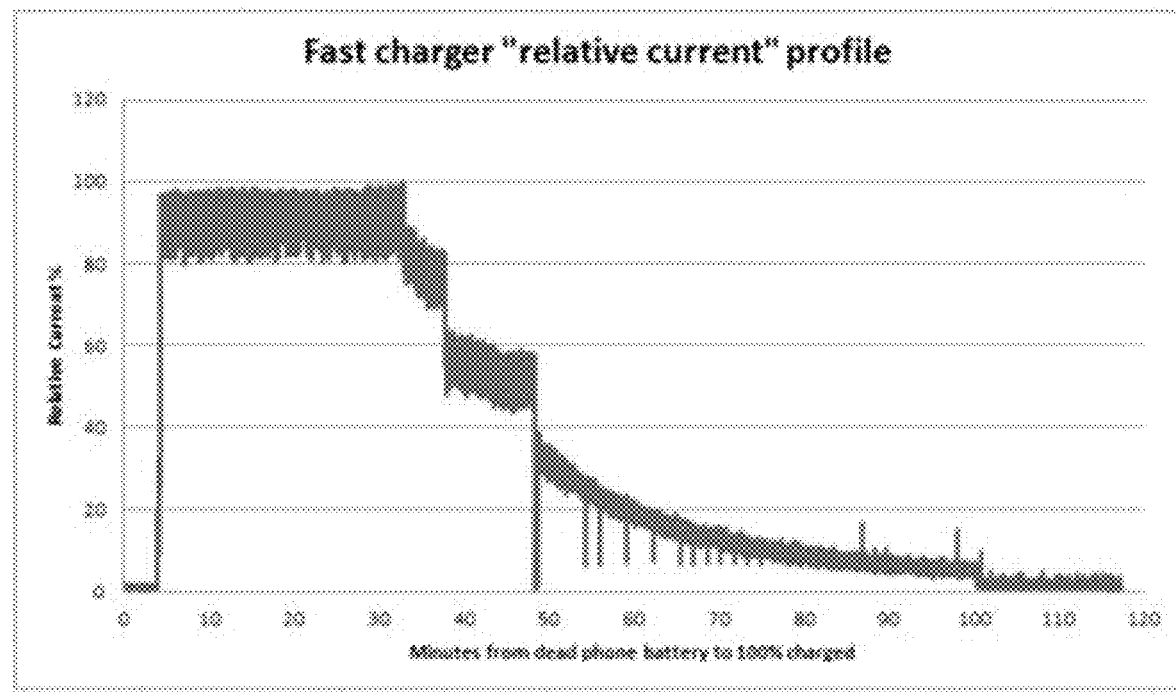
FIGS. 9A-9B illustrates the fast charging current profile and an example charging window for the fast charging, respectively.
Figure 9B:
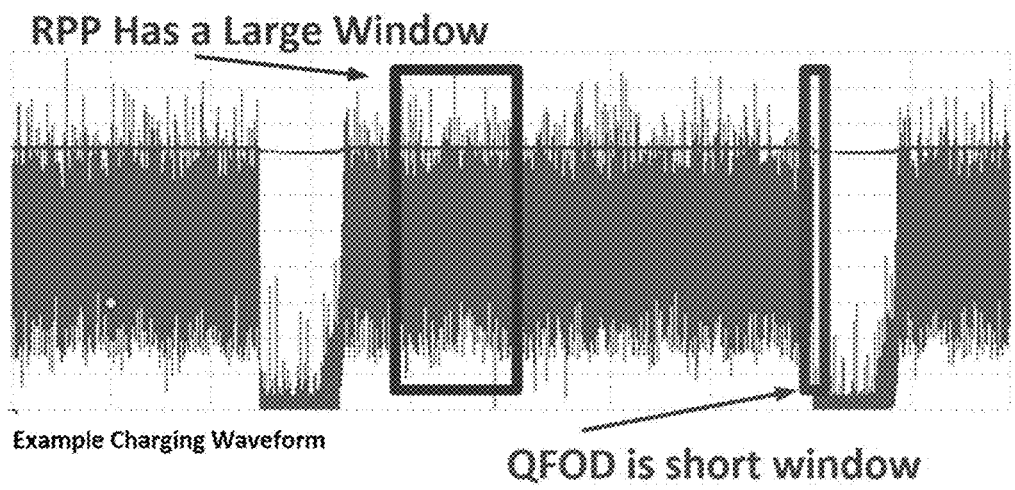

FIG. 9A illustrates a fast charger "relative current" profile while FIG. 9B illustrates an example charging window. Wireless power charging is noisy due to AP loading, device use during phone charging, and thermal throttling adds to the noise profile. The FOD using coil current sensing described herein uses a long window for low noise. In particular, a number of measurements are averaged together, which improves SNR greatly with no impact on power transfer.

In Q-factor FOD (QFOD), the Q-factor of the circuit may be measured and stored, e.g., in time domain as a decay rate of transmitter coil self-resonance, or in frequency domain as a ratio of the peak frequency to the system bandwidth. The measured Q-factor value may be compared with a reference Q-factor value received from the receiving device to determine whether a foreign object is detected. However, a short measurement window is usually used in QFOD, which results in high noise. The short measurement window yields only a few data points (e.g., 10-12 data points), which is highly susceptible to noise. Low SNR adds error to results. Further, running QFOD may often disrupt power transfer, e.g., for Q-factor measurement. Consequently, the FOD using coil current sensing described herein may yield greater performance than using QFOD.

Figure 10A:
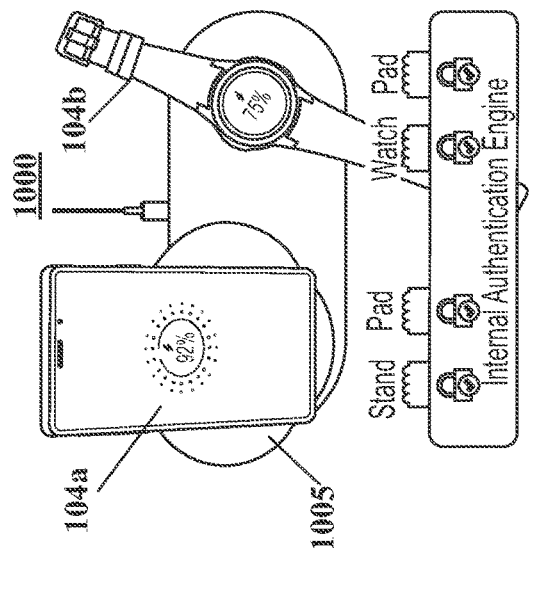
FIGS. 10A-10D provide different examples of multi-coil transmitters for multi-device charging.
Figure 10C:
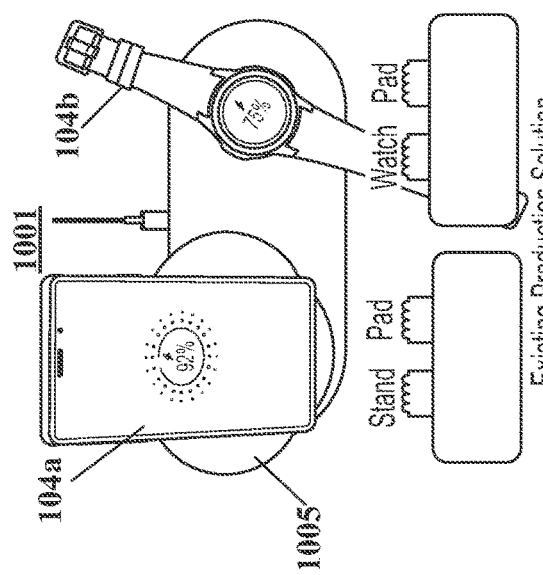
Figure 10B:
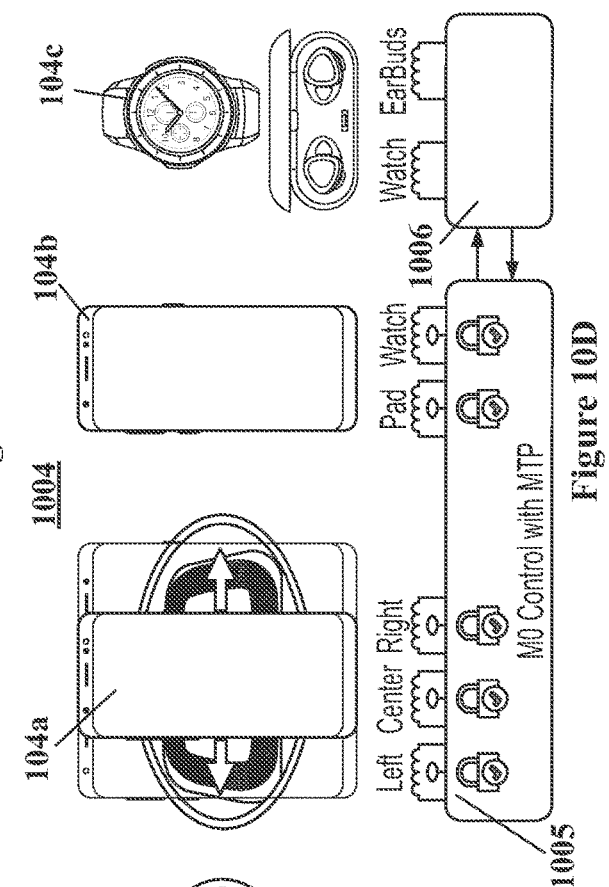
Figure 10D:
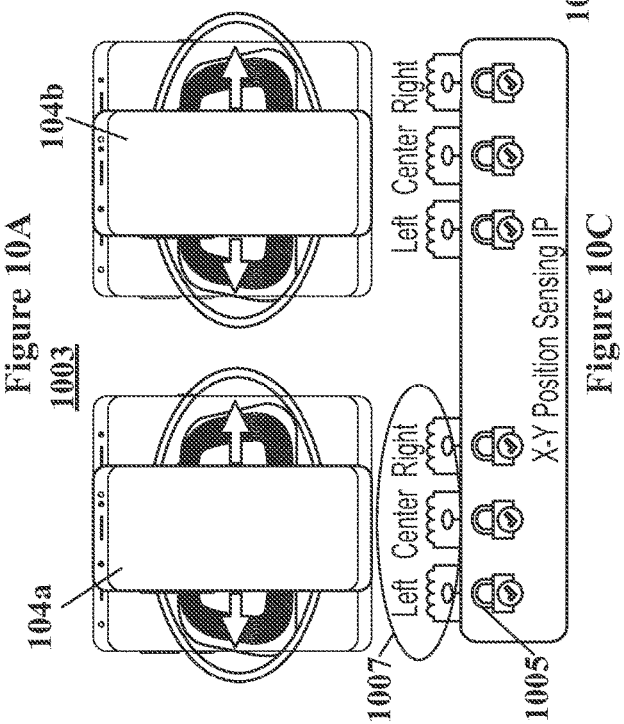

FIGS. 10B-10D provide different examples of multi-coil transmitters for multi-device charging. Each wireless power charger 1005 can be similar to the wireless transmitter 102 in FIG. 1. As shown at diagram 1002 in FIG. 10B, the wireless charger 1005 is configured to provide power transfer to two devices 104a and 104b. Specifically, a single Tx controller chip may be configured to drive multiple coils to transfer power to multiple devices 104a and 104b. As shown at diagram 1003 in FIG. 10C, the wireless charger 1005 may be equipped with multiple coils 1007 placed at different positions and/or orientations for each charging area. The wireless charger 1005 also includes X-Y position sensors to identify a position of the device 104a or 104b placed at the charging area to as to transfer wireless power. In this way, wireless charger 1005 provides spatial freedom to the devices 104a or 104b and is able to charge a variety of different types of devices. As shown at diagram 1004, the wireless charger 1005 may be equipped with a hybrid of different charging plates, e.g., a charging plate with X-Y position sensors, or a charging plate designed for a specific shape of a device such as a pad or a watch, etc. The different charging plates can be driven by a single Tx controller chip. Diagram 1004 further illustrates an embodiment in which another wireless charger 1006 may be connected to wireless charger 1005, via a wired connection or wirelessly, such that an authentication link may be established between the charger 1005 and 1006 through which the charging device(s) 104a-b may authenticate the charging device 104c.

The wireless charger 1005 may include the coil sensing circuits shown in FIGS. 3-5, and adopts the coil sensing method discussed in FIG. 7. In this way, the wireless charger 1005 computes a transmitter power loss based on coil current with enhanced precision for FOD during the wireless power transfer. In addition, the wireless charger 1005, for example, as shown at diagrams 1003, 1004, the larger charging plate of the wireless charger 1005 contains multiple coils (e.g., 3, etc.), which allows greater X-Y position freedom such that the charging device 104a may be placed at different positions (e.g., 3 different positions according to the 3 coils in charger 1005) for charging.

The above detailed description is provided to illustrate specific embodiments of the present invention and is not intended to be limiting. Numerous variations and modifications within the scope of the present invention are possible. The present invention is set forth in the following claims.

What is claimed is:

1. A method for foreign object detection based on coil current sensing at a wireless power transmitting device, comprising:

measuring, via a peak detector at the coil current sensing circuit, a coil peak current value corresponding to a first coil current that passes through a first transmitter coil;

determining, via a coil current sensing circuit at the wireless power transmitting device, a root mean square (RMS) coil current value based on the coil peak current value according to a polynomial relationship between the RMS coil current value and the coil peak current value, wherein the polynomial relationship computes the RMS coil current value as a polynomial function of the coil peak current value;

computing, via a controller at the wireless power transmitting device, a transmitter power loss based on the coil current value; and determining, during wireless power transfer from the wireless power transmitting device to a wireless power receiving device, an existence of a foreign object in vicinity of the first transmitter coil when a change in the computed transmitter power loss meets a threshold condition.

2. The method of claim 1, wherein the polynomial relationship between the room mean square value of the first coil current and the measured coil peak current value is obtained by polynomial regression based on previously obtained data samples of root mean square values of a coil current and peak values of the coil current.

3. The method of claim 1, wherein the measuring, via the peak detector at the coil current sensing circuit, the coil peak current value that passes through the first transmitter coil comprises:
measuring a voltage across the first transmitter coil; and
determining the coil peak current value by dividing the measured voltage by an inductor alternate current resistance of the first transmitter coil.

4. The method of claim 1, wherein the measuring, via the peak detector at the coil current sensing circuit, the coil peak current value that passes through the first transmitter coil comprises:
measuring a voltage across a MOSFET in a switching circuit at the wireless power transmitting device; and
determining the coil peak current value by dividing the measured voltage by a resistance between a drain and a source of the MOSFET.

5. The method of claim 1, wherein the measuring, via the peak detector at the coil current sensing circuit, the coil peak current value that passes through the first transmitter coil comprises:
measuring a voltage across a sensing resistor coupled to the first transmitter coil; and
determining the coil peak current value by dividing the measured voltage by a resistance of the sensing resistor.

6. The method of claim 1, wherein the measuring, via the peak detector at the coil current sensing circuit, the coil peak current value that passes through the first transmitter coil comprises:
amplifying, via an operational amplifier at the coil current sensing circuit, a signal indicative of coil current level;
measuring, via the peak detector, the amplified signal that has an increased signal-noise-ratio; and
sending, to an analog-to-digital converter, the amplified signal.

7. The method of claim 1, wherein the measuring, via the peak detector at the coil current sensing circuit, the coil peak current value that passes through the first transmitter coil comprises:
maintaining a voltage to be measured by the peak detector by using a direct current block capacitor at the coil current sensing circuit.

8. The method of claim 1, wherein the wireless power transmitting device includes the first transmitter coil and a second transmitter coil, and the method further comprising:
selecting, via a selection circuit, to monitor a coil current of the first transmitter coil or the second transmitter coil depending on whether the first transmitter coil or the second transmitter coil is energized.

9. The method of claim 8, further comprising:
configuring a first gate signal to activate a first transistor coupled to the first transmitter coil to pass through the coil current when the first transmitter coil is energized; and
measuring a voltage across a drain and a source of the first transistor.

10. A wireless power transmitting device for foreign object detection based on coil current sensing, comprising:
a first transmitter coil;
a coil current sensing circuit coupled to the first transmitter coil;
a peak detector configured to detect a peak coil peak current value corresponding to a first transmitter current that passes through the first transmitter coil; and
a controller configured to:
determine, via a coil current sensing circuit at the wireless power transmitting device, a root mean square (RMS) coil current value based on the coil peak current value according to a polynomial relationship between the RMS coil current value and the coil peak current value, wherein the polynomial relationship computes the RMS coil current value as a polynomial function of the coil peak current value;
compute a transmitter power loss based on the coil current value;
determine, during wireless power transfer from the wireless power transmitting device to a wireless power receiving device, an existence of a foreign object in vicinity of the first transmitter coil when a change in the computed transmitter power loss meets a threshold condition.

11. The device of claim 10, wherein the curve relationship between the room mean square value of the first coil current and the measured coil peak current value is obtained by polynomial regression based on previously obtained data samples of root mean square values of a coil current and peak values of the coil current.

12. The device of claim 10, wherein the coil sensing circuit is further configured to:
measure a voltage across the first transmitter coil; and
wherein the controller is further configured to determine the coil peak current value by dividing the measured voltage by an inductor alternate current resistance of the first transmitter coil.

13. The device of claim 10, wherein the coil sensing circuit is further configured to measure a voltage across a MOSFET in a switching circuit at the wireless power transmitting device; and wherein the controller is further configured to determine the coil peak current value by dividing the measured voltage by a resistance between a drain and a source of the MOSFET.

14. The device of claim 10, wherein the coil current sensing circuit is configured to measure a voltage across a sensing resistor coupled to the first transmitter coil; and wherein the controller is further configured to determine the coil peak current value by dividing the measured voltage by a resistance of the sensing resistor.

15. The device of claim 10, further comprising:
an operational amplifier configured to amplify a signal indicative of coil current level;
wherein the peak detector is configured to detect the amplified signal that has an increased signal-noise-ratio, and
send, to an analog-to-digital converter, the amplified signal.

16. The device of claim 10, wherein the coil current sensing circuit is further configured to:
maintain a voltage to be measured by the peak detector by using a direct current block capacitor at the coil current sensing circuit.

17. The device of claim 10, further comprising:
a second transmitter coil; and
a selection circuit configured to select to monitor a coil current of the first transmitter coil or the second transmitter coil depending on whether the first transmitter coil or the second transmitter coil is energized.

18. The device of claim 17, wherein the selection circuit includes a first transistor coupled to the first transmitter coil and a second transistor coupled to the second transmitter coil,
- configuring a first gate signal to activate a first transistor coupled to the first transmitter coil to pass through the coil current when the first transmitter coil is energized; and
- measuring a voltage across a drain and a source of the first transistor.

19. The device of claim 10, further comprising:
- a peak conversion circuit configured to convert the detected coil peak current to a root mean square value of the first coil current.

* * * * *